United States Patent [19]

Cooley

[11] 3,836,870

[45] Sept. 17, 1974

[54] LASER GLASS HOST COMPOSITIONS COMPRISING $TeO_2$ AND BaO

[75] Inventor: Richard F. Cooley, Toledo, Ohio

[73] Assignee: Owens-Illinois, Inc., Toledo, Ohio

[22] Filed: June 27, 1973

[21] Appl. No.: 374,107

[52] U.S. Cl............................. 331/94.5, 252/301.4
[51] Int. Cl.............................................. H01s 3/16
[58] Field of Search..... 331/94.5; 252/301.4, 301.6; 106/47

[56] References Cited
UNITED STATES PATENTS
3,462,707   8/1969   Pearson et al. .................... 331/94.5

*Primary Examiner*—William L. Sikes
*Attorney, Agent, or Firm*—Richard D. Heberling; E. J. Holler

[57] ABSTRACT

Laser glass host compositions for effective lasing amounts of $Nd_2O_3$ are disclosed, the laser glass compositions comprising $TeO_2$ and BaO, the compositions generally being:
1. about 77–90 mole percent $TeO_2$ and about 10–23 mole percent BaO; and
2. about 67–73 mole percent $TeO_2$ and about 27–33 mole percent BaO.

Also disclosed are methods of making highly effective laser articles, such as rods and discs, and the new use of the above-described $TeO_2$/BaO glass compositions for forming laser articles, the new use including forming laser articles from the glass compositions, pumping the resultant laser articles to provide an energy inversion, and lasing the pumped article.

15 Claims, No Drawings

LASER GLASS HOST COMPOSITIONS COMPRISING $TeO_2$ AND BaO

INVENTION

The present invention relates to laser glass host compositions for effective lasing amounts of $Nd_2O_3$, the host compositions comprising $TeO_2$ and BaO in certain molar amounts. The present invention also relates to methods of making laser articles, such as rods, with increased efficiency, the methods including the steps of:

1. forming laser articles from glass articles comprising certain amounts of $TeO_2$ and BaO, the glass being host for an effective lasing amount of $Nd_2O_3$;
2. pumping the laser article to provide an energy inversion; and
3. lasing the pumped article.

The present invention also relates to a method for making an outstanding, highly efficient glass laser article by melting laser glass batch-forming materials to provide a molten glass comprising certain amounts of $TeO_2$ and BaO, the molten glass, when solidified, being capable of functioning as a host for an effective lasing amount of $Nd_2O_3$; forming a glass blank from the molten glass; and fabricating the outstanding laser articles from the blank.

It is desirable to provide laser glass compositions that can be used to make outstanding, highly efficient glass laser articles. It is also desirable to provide a new use for glass compositions comprising $TeO_2$ and BaO in which the new use includes the steps of:

1. forming a glass laser article from the above-described glass composition that is a host for an effective amount of $Nd_2O_3$;
2. pumping the laser article; and
3. lasing the pumped article.

It is an object of the present invention to provide a laser glass composition containing $TeO_2$ and BaO, the molar amounts thereof being defined by the following compositional ranges:

1. about 77–90 mole percent $TeO_2$ and about 10–23 mole percent BaO; or
2. about 67–73 mole percent $TeO_2$ and about 27–33 mole percent BaO, the glass composition also being a host for an effective lasing amount of $Nd_2O_3$.

It is an object of the present invention to provide a method for making a glass article, such as a glass laser rod, disc or the like, the method comprising the steps of:

1. melting laser glass batch-forming materials to provide molten glass comprising $TeO_2$ and BaO in certain molar proportions, namely:
   a. about 77–90 mole percent $TeO_2$ and about 10–23 mole percent BaO; or
   b. about 67–73 mole percent $TeO_2$ and 27–33 mole percent BaO, the molten glass, when solidified, being a host for an effective lasing amount of $Nd_2O_3$;
2. forming a glass laser blank from the molten glass; and
3. fabricating a laser article from the blank to provide a very efficient laser article.

It is an object of the present invention to provide the new use for a glass composition as a glass laser article in which the glass comprises $TeO_2$ and BaO in certain molar proportions; namely:

1. about 77–90 mole percent $TeO_2$ and about 10–23 mole percent BaO; or
2. about 67–73 mole percent $TeO_2$ and about 27–33 mole percent BaO, the glass being a host for an effective lasing amount of $Nd_2O_3$, the new use comprising the steps of:

1. forming a glass laser article from the glass composition comprising $TeO_2$ and BaO, along with the effective lasing amount of $Nd_2O_3$;
2. pumping the laser article to provide an energy inversion; and
3. passing monochromatic light through the pumped article to cause a stimulated emission at about 1.06 microns.

It is an object of the present invention to provide an outstanding, highly efficient glass laser article, including a rod or disc, made from a glass composition comprising $TeO_2$ and BaO in certain molar amounts and containing an effective lasing amount of $Nd_2O_3$.

These and other objects will become apparent from the specification that follows and the appended claims.

The present invention provides excellent laser glass host compositions for effective lasing amounts of $Nd_2O_3$, the host compositions comprising $TeO_2$ and BaO, the compositions having certain molar proportions according to the following two compositions:

1. about 77–90 mole percent $TeO_2$ and about 10–23 mole percent BaO; and
2. about 67–73 mole percent $TeO_2$ and about 27–33 mole percent BaO, the glass being a host for an effective lasing amount of $Nd_2O_3$. Preferably, the molar amounts of $TeO_2$ and BaO are set forth in the following two compositions:

1. about 82–85 mole percent $TeO_2$ and about 15–18 mole percent BaO; and
2. about 69–71 mole percent $TeO_2$ and about 29–31 mole percent BaO, these compositions containing an effective lasing amount of $Nd_2O_3$, which is preferably about 0.01–1.5 mole percent.

The present invention also provides methods for making highly efficient glass laser articles, the methods including the steps of:

1. melting laser glass batch-forming materials to provide a molten glass comprising $TeO_2$ and BaO in certain molar proportions as set forth in the following two compositions:
   a. about 77–90 mole percent $TeO_2$ and 10–23 mole percent BaO; and
   b. about 67–73 mole percent $TeO_2$ and about 27–33 mole percent BaO, the glass being an effective host for an effective lasing amount of $Nd_2O_3$;
2. forming a glass laser blank from the molten glass; and
3. fabricating outstanding laser articles from the laser blank.

The present invention provides the new use for a glass composition as a glass article in which the glass comprises $TeO_2$ and BaO in one of the two compositions as follows:

1. about 77–90 mole percent $TeO_2$ and 10–23 mole percent BaO; or
2. about 67–73 mole percent $TeO_2$ and about 27–33 mole percent BaO, the glass being a host for an effective lasing amount of $Nd_2O_3$; the new use comprising the steps of:

1. forming a glass laser article from the glass compositions comprising $TeO_2$ and BaO with an effective lasing amount of $Nd_2O_3$;
2. pumping the laser article to provide an energy inversion; and
3. lasing the pumped laser article.

A zinc tellurite glass consisting essentially of a major molar proportion of $TeO_2$ and between about 20 and 40 molar percent of ZnO is described and claimed in Redman, U.S. Pat. No. 3,423,326. These zinc tellurite glasses were reported as having some fluorescent activity when doped with $Nd_2O_3$.

As previously indicated, the outstanding laser glass host compositions of the present invention surprisingly exhibit much higher fluorescent activity than the zinc tellurite glasses of U.S. Pat. No. 3,423,326, the increased fluorescent activity indicating a greater lasing efficiency for laser articles made from the host compositions of the present invention. As previously described, only certain molar proportions of $TeO_2$, ZrO and ZnO can be used to provide the highly efficient laser articles, such as rods and discs. The increase in fluorescent activity is generally at least about 50% and preferably at least about 60 or 70%, the increase often being as much as 100% or more.

In the previously mentioned Redman U.S. Pat. No. 3,423,326, there is no mention of any glass system other than that of a glass host composition consisting essentially of tellurium oxide and zinc oxide. There is no suggestion in the previously mentioned Redman patent that highly efficient laser articles can be made from a host composition containing certain molar amounts of $TeO_2$ and BaO.

The outstanding laser glass host compositions of the present invention, as previously indicated, contain $TeO_2$ and BaO, in general ranges, according to the following two compositions:
1. about 77–90 mole percent $TeO_2$ and about 10–23 mole percent BaO; and
2. about 67–73 mole percent $TeO_2$ and about 27–33 mole percent BaO, the glass being a host for an effective lasing amount of $Nd_2O_3$, which is generally about 0.01–1.5 mole percent and is preferably about 0.5–1.2 mole percent.

Excellent glass laser host compositions are those, for instance, in which the glass comprises about 77 mole percent $TeO_2$ and 23 mole percent BaO; or about 83 mole percent $TeO_2$ and 17 mole percent BaO; or 80 mole percent $TeO_2$ and 20 mole percent BaO.

An increased lasing efficiency is obtained for glass laser rods and discs in accordance with the present invention. The increase in fluorescent activity unexpectedly is at least about 50% over that of a zinc tellurite glass containing 65 mole percent $TeO_2$ and 35 mole percent ZnO. The increase in fluorescent activity of the glasses of the present invention is surprisingly at least about 50% over that of a lithia-calcia-alumino silicate glass rod, as set forth, for instance, in U.S. Pat. No. 3,471,409, to Lee and Rapp, the composition comprising the ingredients that follow in approximate mole percentages:

| Ingredient | Mole Percent |
| --- | --- |
| $SiO_2$ | 60 |
| $Al_2O_3$ | 2.5 |
| $Li_2O$ | 27.5 |
| CaO | 10 |
| $Nd_2O_3$ | 0.5 |

In general, the highest fluorescent intensity value for a zinc tellurite glass, as described above containing 35 mole percent ZnO, is about 2.7; and the highest fluorescent intensity value of the above-described lithia-calcia-alumino silicate glass laser is about 2.3.

The following examples are intended to illustrate the present invention and not to limit the same in any way.

EXAMPLE 1

PART A

A 15 gram melt was prepared by mixing reagent grade raw materials, in the following molar percent and also for convenience, weight percent, with 30 ml. of water.

| Ingredients | Mole Percent | | Weight Percent | |
| --- | --- | --- | --- | --- |
| | Host Glass | Laser Article | Host Glass | Laser Article |
| $TeO_2$ | 66.7 | 66.2 | 87.8 | 66.4 |
| BaO | 33.3 | 33.0 | 22.2 | 31.9 |
| $Nd_2O_3$ | | 0.8 | | 1.8 |

The slurry was mixed for 10 minutes and poured into a gold crucible. The crucible was placed in an air circulating oven with the temperature maintained at 110° C. overnight to remove the water. The crucible was then placed in an electric resistance furnace with the temperature at 750° C. for 3 hours, or until homogenous, after which the molten glass immediately poured into a preheated (260° C.) graphite mold forming a disc having an 11/16 inch diameter and ¼ inch thickness. The graphite mold was placed in an annealing oven maintained at 340° C. After 1 hour, at 340° C., the temperature of the annealing oven was lowered at a rate of 38° C. per hour to 250° C. after which the annealing oven was turned off and the mold cooled to room temperature.

The solid, annealed glass disc was removed from the mold, wet ground and polished with close tolerance to a thickness of 0.195 inches and a diameter of 0.687 inches. The refractive index of the finished polished glass disc was measured to be 2.13.

PART B

The polished glass disc from Part A was tested for fluorescence intensity and decay time in a high power pulsed test system. The disc was placed in a holder and exposed to a beam of light from an EG and G model FX 12–25 xenon flash lamp. The flash lamp had a flash duration of about 20 microseconds. The disc was not observed to solarize after repeated excitation by the flash lamp. The fluorescence intensity and decay time of the excited sample was measured by photographing the oscilloscope display of the 1,060 nonometer fluorescent intensity versus time on a Tektronix Model 556, Dual Trace oscilloscope connected to an RCA S-1 photomultiplier, having a narrow band pass filter.

The fluorescence intensity measurement was normalized against ED-2, a glass laser composition of Owens-Illinois, Inc., comprising, in mole percent, 60.0% $SiO_2$, 2.5% $Al_2O_3$, 27.5% $Li_2O$, 10% CaO, 0.16% $CeO_2$ and 0.5% $Nd_2O_3$, disclosed in U.S. Pat. No. 3,471,409, as Example 1. The fluorescence intensity was found to be 2.87 when normalized against the glass laser composition; 2.87 times the intensity of the glass laser composition.

The fluorescence intensity was corrected for the refractive indices of the glass disc and the reference glass laser composition by $$FI \text{ (corrected)} = FI \text{ (normalized)} [(1.56)^2/(\eta \text{glass disc})^2]$$

The corrected fluorescence intensity was 1.54. The fluorescence decay time was 170 microseconds.

The refractive index of the finished polished glass disc was measured to be 2.05.

PART B

The polished glass disc from Part A was tested for fluorescence intensity and decay time as described in Part B of Example 1. The normalized fluorescence intensity was 3.10 and the corrected fluorescence intensity was 1.74. The fluorescence decay time was 174 microseconds.

EXAMPLE 4
PART A

A 15 gram melt was prepared and polished glass discs prepared therefrom as described in Part A of Example 1, except the molar or weight percentages of the raw materials were as follows:

| Ingredients | Mole Percent | | Weight Percent | |
| --- | --- | --- | --- | --- |
| | Host Glass | Laser Article | Host Glass | Laser Article |
| $TeO_2$ | 80.0 | 79.4 | 80.4 | 79.4 |
| BaO | 20.0 | 19.8 | 19.6 | 19.1 |
| $Nd_2O_3$ | | 0.7 | | 1.5 |

EXAMPLE 2
PART A

A 15 gram melt was prepared and polished glass discs prepared therefrom as described in Part A of Example 1 except the molar or weight percentages of the raw materials were as follows:

| Ingredients | Mole Percent | | Weight Percent | |
| --- | --- | --- | --- | --- |
| | Host Glass | Laser Article | Host Glass | Laser Article |
| $TeO_2$ | 90.0 | 89.2 | 90.3 | 88.8 |
| BaO | 10.0 | 9.9 | 9.6 | 9.8 |
| $Nd_2O_3$ | | 0.8 | | 1.7 |

The refractive index of the finished polished glass disc was measured to be 2.13.

PART B

The polished glass disc from Part A was tested for fluorescence intensity and decay time as described in Part B of Example 1. The normalized fluorescence intensity was 2.41 and the corrected fluorescence intensity was 1.25. The fluorescence decay time was 140 microseconds.

EXAMPLE 3
PART A

A 15 gram melt was prepared and polished glass discs prepared therefrom as described in Part A of Example 1, except the molar or weight percentages of the raw materials were as follows:

| Ingredients | Mole Percent | | Weight Percent | |
| --- | --- | --- | --- | --- |
| | Host Glass | Laser Article | Host Glass | Laser Article |
| $TeO_2$ | 80.0 | 79.6 | 80.4 | 79.6 |
| BaO | 20.0 | 19.8 | 19.6 | 19.1 |
| $Nd_2O_3$ | | 0.6 | | 1.2 |

The refractive index of the finished polished glass disc was measured to be 2.09.

PART B

The polished glass disc from Part A was tested for fluorescence intensity and decay time as described in Part B of Example 1. The normalized fluorescence intensity was 3.94 and the corrected fluorescence intensity was 2.95. The fluorescence decay time was 165 microseconds.

Other specific compositions set forth herein as being suitable for use in the glass host compositions of the present invention can be substituted for the specific glass compositions used in the working examples to provide substantially equivalent results; for instance, any of the compositions set forth within the previously described two compositional ranges:

1. about 77–90 mole percent $TeO_2$ and 10–23 mole percent BaO; or 2. about 67–73 mole percent $TeO_2$ and about 77–33 mole percent BaO can be used in place of the specific laser compositions used in the working examples; for example, the host glass composition of 66.7 mole percent $TeO_2$ and 33.3 mole percent BaO, set forth in Example 1. As previously indicated, substantially equivalent results can be obtained when the above laser glass host composition set forth in Example 1 is substituted for by a host composition comprising 77 mole percent $TeO_2$ and 23 mole percent BaO; or a host composition comprising 83 mole percent $TeO_2$ and about 17 mole percent BaO.

What is claimed is:

1. A laser glass composition comprising $TeO_2$ and BaO, the proportions of $TeO_2$ and BaO in molar amounts being about 77–90 mole percent $TeO_2$ and about 10–23 mole percent BaO or about 67–73 mole percent $TeO_2$ and about 27–33 mole percent BaO, the glass being a host for an effective lasing amount of $Nd_2O_3$.

2. A laser glass composition as defined in claim 1 in which the proportion of $TeO_2$ to BaO is about 77–90 mole percent $TeO_2$ and about 10–23 mole percent BaO.

3. A laser glass composition as defined in claim 1 in which the proportion of $TeO_2$ to BaO is about 67–73 mole percent $TeO_2$ and about 27–33 mole percent BaO.

4. A laser glass composition as defined in claim 1 in which the proportions of $TeO_2$ and BaO are about 82–85 mole percent $TeO_2$ and about 15–18 mole percent BaO.

5. A laser glass composition comprising about 69–71 mole percent $TeO_2$, about 29–31 mole percent BaO, and an effective lasing amount of $Nd_2O_3$.

6. A laser glass composition as defined in claim 1 in which the amount of $Nd_2O_3$ is about 0.01 to 1.5 mole percent.

7. A laser glass composition as defined in claim 1 in which there is 77 mole percent $TeO_2$ and 23 mole percent BaO.

8. A laser glass composition as defined in claim 1 in which the amount of $TeO_2$ is about 83 mole percent and the amount of BaO is about 17 mole percent.

9. A laser glass composition as defined in claim 1 comprising 80 mole percent $TeO_2$ and 20 mole percent BaO, the composition exhibiting an increase in laser efficiency over that of a lithia-calcia-silicate laser glass composition containing $Nd_2O_3$.

10. In a method of making a glass laser composition in which the glass laser has increased laser efficiency, the improvement which comprises preparing a laser article from a glass host comprising $TeO_2$ and BaO, the amounts of $TeO_2$ and BaO being about 77–90 mole percent $TeO_2$ and about 10–23 mole percent BaO or about 67–73 mole percent $TeO_2$ and about 27–33 mole percent BaO, the host containing an effective lasing amount of $Nd_2O_3$.

11. A method of making a laser glass composition having increased lasing efficiency, the method comprising the steps of making a glass host from a $TeO_2$/BaO glass composition, the proportions of $TeO_2$ and BaO in molar amounts being about 77–90 mole percent $TeO_2$ and about 10–23 mole percent BaO or about 67–73 mole percent $TeO_2$ and about 27–33 mole percent BaO, and an effective lasing amount of $Nd_2O_3$.

12. The new use of a $TeO_2$/BaO glass composition as a glass host for $Nd_2O_3$ for a laser article such as a rod, disc and the like, the new use comprising:
  1. forming a laser article from a glass composition comprising $TeO_2$ and BaO, the proportions of $TeO_2$ and BaO in molar amounts being about 77–90 mole percent $TeO_2$ and about 10–23 mole percent BaO or about 67–73 mole percent $TeO_2$ and about 27–33 mole percent BaO, the glass being a host for an effective lasing amount of $Nd_2O_3$;
  2. pumping the laser article to cause an energy inversion; and
  3. passing monochromatic light through the article to cause stimulated emission at a wavelength of about 1.06 microns.

13. A laser glass article made from the composition defined in claim 1.

14. An article as defined in claim 1 in the form of a rod.

15. A laser article made by the method defined in claim 11.

* * * * *